United States Patent [19]

Kodiyalam et al.

[11] Patent Number: 5,473,122

[45] Date of Patent: Dec. 5, 1995

[54] DUAL-CONSTRAINED VISCOELASTIC DAMPING MECHANISM FOR STRUCTURAL VIBRATION CONTROL

[75] Inventors: Srinivas Kodiyalam, Schenectady, N.Y.; Clyde V. Stahle, Jr., Downingtown, Pa.; Dennis H. Hill, Pottstown, Pa.; John D. Molnar, Langhorne, Pa.; John A. Chionchio, Hatboro, Pa.

[73] Assignee: Martin Marietta Corporation, East Windsor, N.J.

[21] Appl. No.: 087

[22] Filed: Jan. 4, 1993

[51] Int. Cl.⁶ ............................................. F16F 7/00
[52] U.S. Cl. ........................ 181/207; 181/290; 181/294
[58] Field of Search ................................. 181/207, 208, 181/210, 290, 292, 294, 295

[56] References Cited

U.S. PATENT DOCUMENTS

| | | | |
|---|---|---|---|
| 3,160,549 | 12/1964 | Caldwell et al. | 181/208 |
| 3,249,659 | 5/1966 | Voelker | 181/292 |
| 4,416,349 | 11/1983 | Jacobs | 181/208 |
| 4,425,980 | 1/1984 | Miles | 181/208 |
| 4,447,493 | 5/1984 | Driscoll et al. | 181/210 X |
| 4,778,028 | 10/1988 | Staley | 181/208 |
| 5,087,511 | 2/1992 | Locey | 428/218 |
| 5,256,223 | 10/1993 | Alberts et al. | 181/208 X |
| 5,262,232 | 11/1993 | Wilfong et al. | 428/327 |

*Primary Examiner*—Michael L. Gellner
*Assistant Examiner*—Eddie C. Lee
*Attorney, Agent, or Firm*—W. H. Meise; C. A. Berard; S. A. Young

[57] ABSTRACT

A passive damping mechanism for a panel member in which a bonding layer is disposed on each side of the panel, a damping layer is disposed on each of the two bonding layers, and a constraining layer is disposed on each of the two damping layers. Each of the above-mentioned layers is coextensive with the respective panel surfaces to which it is attached. The bonding layers are preferably made of an aramid fiber material. The damping layers are preferably made of a viscoelastic material. The constraining layers are preferably made of an aluminum-graphite metal matrix composite material. In addition, the coefficient of thermal expansion of each bonding layer should match well with that of each constraining layer.

1 Claim, 1 Drawing Sheet

DUAL-CONSTRAINED VISCOELASTIC DAMPING MECHANISM FOR STRUCTURAL VIBRATION CONTROL

BACKGROUND OF THE INVENTION

This invention relates generally to a passive damping mechanism for structural vibration control and particularly to vibration control in structure used in aerospace applications.

The control of dynamic vibrations is critical to the operational success of several types of systems. This is particularly true for aerospace systems in which problems resulting from vibrations are prevalent. For obvious reasons, space structures must be made to be as light as possible (it is estimated that each pound of launch weight increases the cost of the launch by about $25,000). These lightweight space structures are highly flexible and in general are characterized by low stiffness-to-mass ratios. This results in a cluster of many low frequency, lightly-damped vibration modes. In a large space structure such as a satellite, the primary mission is usually to gather, transmit and/or receive information from the ground, space or other deployed satellites. This is accomplished with precision measuring instruments mounted on the payload mounting platform of the satellite. Mission goals dictate stringent pointing requirements for the measuring instruments. Thus, the dynamic stability of these instruments is extremely important. Ensuring the required stability is a complex task given the level of vibrations typically encountered.

Both passive damping and active control systems have been used in space structures to meet the dynamic performance requirements. Passive damping typically involves either the modification of key structural design parameters which affect the structural mass, stiffness and damping characteristics or the use of special energy absorbing materials such as viscoelastic materials. Thus, passive damping does not have the power requirements of active control systems and typically adds less weight. A known approach for using viscoelastic materials to dampen vibrations has been to strategically apply strips of viscoelastic material on the platform with a stiff constraining layer to induce shear in the viscoelastic material. However, the incorporation of viscoelastic material in a weight effective manner and the specific positioning of the viscoelastic strips on the platform present difficult design challenges. Furthermore, the positioning of the viscoelastic strips limits the locations on the platform where measuring instruments can be mounted. These issues illustrate some of the complexities faced in vibration control of aerospace structures.

SUMMARY OF THE INVENTION

Accordingly, it is an object of the present invention to provide passive vibration control which lessens the complexities of conventional approaches.

More specifically, it is an object of the present invention to provide a damping mechanism which increases structural flexibility so that more strain energy will be induced, thus increasing damping.

In addition, it is an object of the present invention to provide a damping mechanism which is weight efficient, durable and robust.

It is another object of the present invention to provide a damping mechanism which is less susceptible to the adverse effects of thermal cycling.

It is yet another object of the present invention to provide a damping mechanism which is more easily fabricated and simplifies overall system design.

These and other objects are accomplished in the present invention by a damping mechanism for a panel member in which a bonding layer is disposed on each side of the panel, a damping layer is disposed on each of the two bonding layers, and a constraining layer is disposed on each of the two damping layers. Each of the above-mentioned layers is coextensive with the respective panel surfaces to which it is attached. The bonding layers are preferably made of an aramid fiber material. The damping layers are preferably made of a viscoelastic material. The constraining layers are preferably made of an aluminum-graphite metal matrix composite material. In addition, the coefficient of thermal expansion of each bonding layer matches well with that of each constraining layer.

Other objects and advantages of the present invention will become apparent upon reading the following detailed description and the appended claims and upon reference to the accompanying drawings.

DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE INVENTION

Figure 1:
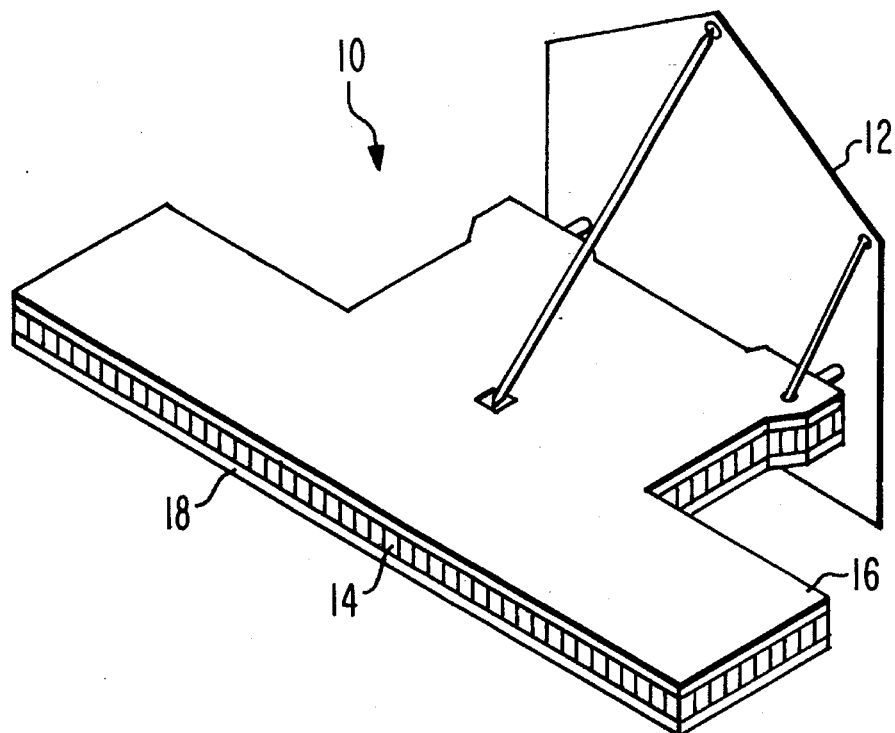
FIG. 1 is an isometric view of a satellite payload mounting platform having the damping mechanism of the present invention.

Referring to the drawings wherein identical reference numerals denote the same elements throughout the various views, FIG. 1 shows a payload mounting platform 10 for a satellite which employs the damping mechanism of the present invention. While the damping mechanism is shown in use with a payload mounting platform for a satellite, this is only illustrative and not meant to be limiting; the present invention can be used in a wide range of aerospace, as well as non-aerospace, applications.

The payload mounting platform 10 is mounted to the employment support module 12 (shown schematically in FIG. 1) of the satellite and typically supports various instruments carried by the satellite. The rest of the satellite structure is not shown in FIG. 1 to simplify the Figure. The payload mounting platform 10 comprises a base member 14 which is typically an aluminum honeycomb panel structure. As seen in FIG. 1, the damping mechanism of the present invention comprises an upper damping assembly 16 and a lower damping assembly 18. The upper damping assembly 16 is mounted to and coextensive with the upper surface of the base member 14, and the lower damping assembly 18 is mounted to and coextensive with the lower surface of the base member 14.

Figure 2:
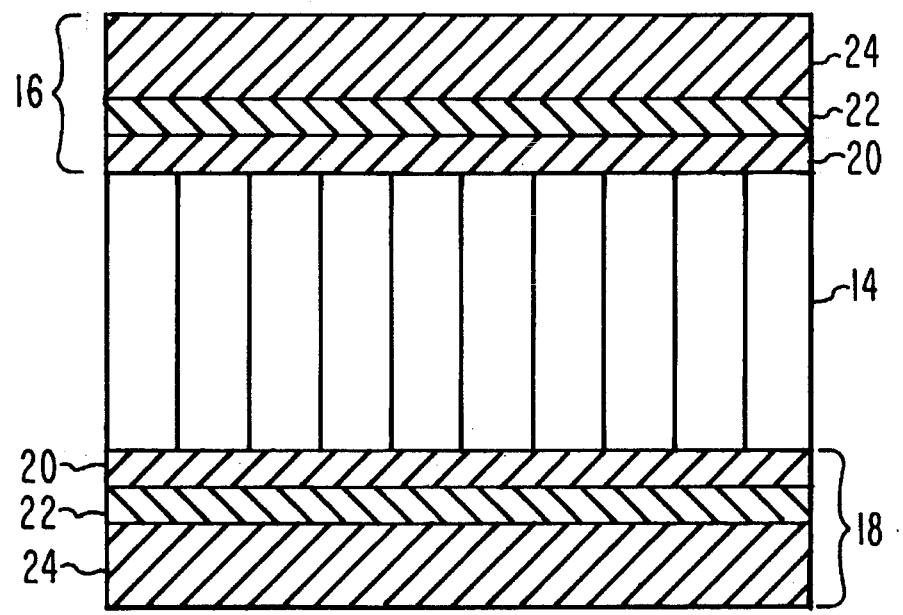
FIG. 2 is a cross-sectional view of a portion of the platform of FIG. 1.

Both the upper damping assembly 16 and the lower damping assembly 18 comprise multilayered configurations shown best in FIG. 2. Specifically, each damping assembly includes a bonding layer 20 disposed directly on the respective surfaces of the base member 14, a viscoelastic damping layer 22 disposed on each bonding layer 20, and a constraining layer 24 disposed on each damping layer 22. Each bonding layer 20 acts to transmit shear load from the base member 14 to the respective damping layers 22, and the constraining layers 24 induce shear during deformation in the respective damping layers 22. Shearing strain induced in the damping layers 22 results in energy dissipation which reduces vibrations. The provision of damping assemblies on both sides of the payload mounting platform 10 rather than just one side increases the levels of strain energy which are achievable, thereby increasing the damping effect.

The bonding layers 20 are made of a flexible material, preferably an aromatic polyamide or aramid fiber such as that which is available commercially from DuPont under the trademark KEVLAR. The flexibility of the bonding layers 20 makes the entire structure more flexible, thereby increasing deformation and hence the dissipation in the damping layers 22. KEVLAR fiber is a low modulus, low density material which has an extremely high tensile strength. Thus, in addition to providing the required flexibility, the use of KEVLAR fiber for the bonding layers 20 would tend to prevent sharp edges of the honeycomb base member 14 from piercing the fragile viscoelastic material of the damping layers 22. KEVLAR fiber also has a low coefficient of thermal expansion (CTE) which matches well with the CTE of the constraining layers 24 thereby avoiding potential problems, such as delamination, which result from thermal cycling caused by the varying temperatures the satellite is exposed to.

A preferred viscoelastic material for the damping layer 22 is the viscoelastic damping material SMRD 100B37-T2B. This is a viscoelastic epoxy formulation manufactured by the General Electric Company which has a shear modulus of 125 psi and a Possion's ratio of 0.48. Other suitable viscoelastic materials include GE's SMRD 100F90B damping material, Avery International's Avery 1125 damping material and 3M's 3M ISD-112 damping material.

The primary purpose of the constraining layers 24 is to induce shear in the viscoelastic damping layers 22. The amount of damping provided provided by a constrained viscoelastic damping layer depends in part on the stiffness of the constraining layer. A constraining layer with a stiffness closely matching that of the base member 14 results in maximum shear strain in the damping layer. The constraining layers 24 of the present invention are preferably metal matrix composite (MMC) materials. The important characteristics in selecting a specific material include a high specific stiffness (i.e., Young's modulus to weight ratio), a high yield strength, and a low coefficient of thermal expansion. Thus, a preferred material for the constraining layers 24 is the MMC known commercially as P120/6061 Aluminum. This is aluminum reinforced with Amoco Performance Products P120 ultra high modulus graphite fiber. This material has a Young's modulus of $31.7 \times 10^6$ psi, a yield strength of 12,000 psi, and a CTE of $1.7 \times 10^{-6}$ in/in/°F. Other suitable MMC materials include carbon reinforced aluminum and silicon carbide reinforced aluminum.

As mentioned above, the upper and lower damping assemblies 16,18 are both coextensive with the respective surfaces on the base member 14 to which they are attached. That is, each damping assembly, and hence each individual layer in the assemblies, completely covers the respective surface of the base member 14. This uniform coverage means that the entire surface of the structure will be available for mounting purposes. Thus, the structure will be easier to design and easier to fabricate.

In a specific example of the payload mounting platform of FIGS. 1 and 2, the base member 14 consisted of a 4.04 inch thick aluminum honeycomb core panel. Each bonding layer 20 was a 0.0087 inch thick layer of KEVLAR fiber, each damping layer 22 was a 0.0065 inch thick layer of GE's SMRD 100B37-T2B viscoelastic damping material, and each constraining layer 24 was a 0.04 inch thick layer of P120/6061 Aluminum. Given these dimensions, the payload mounting platform using the dampening mechanism of the present invention had a predicted weight which was 10% less than an equally-sized payload mounting platform using the conventional viscoelastic strip approach.

The foregoing has described a new damping mechanism which uses a dual, coextensive constrained damping layer with a bonding layer to passively control vibrations in a weight efficient manner.

While specific embodiments of the present invention have been described, it will be apparent to those skilled in the art that various modifications thereto can be made without departing from the spirit and scope of the invention as defined in the appended claims.

What is claimed is:

1. A mechanism for damping vibrations in a base structure having at least two surfaces, said mechanism comprising:

a first bonding layer disposed on a first one of Said at least two surfaces;

a first damping layer disposed on said first bonding layer:

a first constraining layer disposed on said first damping layer;

a second bonding layer disposed on a second one of said at least two surfaces;

a second damping layer disposed on said second bonding layer; and a second constraining layer disposed on said second damping layer; wherein said first and second damping layers are made from a viscoelastic material.

\* \* \* \* \*